US010294888B2

(12) United States Patent
Zhang et al.

(10) Patent No.: US 10,294,888 B2
(45) Date of Patent: May 21, 2019

(54) PISTON BALANCING HEAT DISSIPATION AND COMBUSTION PROPERTIES IN INTERNAL COMBUSTION ENGINE

(71) Applicant: Caterpillar Inc., Peoria, IL (US)

(72) Inventors: Shu Zhang, Dunlap, IL (US); Aaron Harmon, Dunlap, IL (US); Nikhil Lulla, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 27 days.

(21) Appl. No.: 15/254,704

(22) Filed: Sep. 1, 2016

(65) Prior Publication Data

US 2018/0058371 A1 Mar. 1, 2018

(51) Int. Cl.

*F01P 1/04* (2006.01)
*F02F 3/28* (2006.01)
*F02B 23/06* (2006.01)
*F02F 3/22* (2006.01)

(52) U.S. Cl.

CPC ............ *F02F 3/28* (2013.01); *F02B 23/0696* (2013.01); *F02F 3/22* (2013.01); *Y02T 10/125* (2013.01)

(58) Field of Classification Search

CPC ..................................... F02F 3/28; F02F 3/22
USPC ....................................................... 123/41.35
See application file for complete search history.

(56) References Cited

U.S. PATENT DOCUMENTS 6,314,933 B1 * 11/2001 Iijima ................. F02B 23/0696 123/193.6
6,622,471 B1 * 9/2003 Nagel ....................... F01B 9/06 123/197.4
6,854,439 B2 * 2/2005 Regueiro ................ F02B 19/08 123/193.6
7,210,448 B2 * 5/2007 Stanton ............... F02B 23/0651 123/298
8,677,970 B2 3/2014 Venugopal
8,978,621 B2 * 3/2015 Easley ................ F02B 23/0624 123/193.6
9,234,451 B2 * 1/2016 Karch ..................... F02B 23/06
9,243,582 B2 * 1/2016 Schneider ............... F02F 3/003
9,328,693 B2 * 5/2016 Pierpont ............... F02F 3/0076
9,334,958 B2 * 5/2016 Schneider .................. F16J 1/08
9,638,131 B2 * 5/2017 Koci .................. F02B 23/0651
2014/0331957 A1 11/2014 Nishida

FOREIGN PATENT DOCUMENTS

FR 2857698 * 1/2005 ............. F02B 31/08

* cited by examiner

*Primary Examiner* — Hung Q Nguyen
*Assistant Examiner* — Anthony Donald Taylor, Jr.
(74) *Attorney, Agent, or Firm* — Jonathan F. Yates

(57) ABSTRACT

A piston for an internal combustion engine includes a piston crown having a combustion bowl formed therein, a piston rim extending circumferentially around the combustion bowl and a heat-dissipating chamfer between the combustion bowl and the piston rim. The chamfer is structured by way of at least one of size, angle, or material thickness to an oil gallery to balance heat dissipation with combustion properties. Related methodology is disclosed.

20 Claims, 2 Drawing Sheets

PISTON BALANCING HEAT DISSIPATION AND COMBUSTION PROPERTIES IN INTERNAL COMBUSTION ENGINE

TECHNICAL FIELD

The present disclosure relates generally to a piston for an internal combustion engine, and more particularly to a piston body having a chamfer adjoining a combustion bowl and a piston rim and being structured to balance heat dissipation with combustion properties of the piston.

BACKGROUND

A great many different operating strategies and component designs are known in the field of internal combustion engines. Research and development has progressed for decades in relation to the manner in which factors such as fueling, exhaust gas recirculation, turbocharging, and variable valve actuation can be varied to produce different results. In addition to variation in these and other operating parameters, a great deal of research and testing effort has gone into the different ways that engine components, such as pistons, can be shaped and proportioned, and formed from various materials. One motivation driving advancements in combustion science and related research has been the desire to reduce relative amounts of certain emissions in engine exhaust, such as particulate matter and oxides of nitrogen or NOx. Other motivations relate to improving or optimizing engine performance, reducing fuel consumption, limiting component wear and/or fatigue and still others.

Efforts to accommodate the various different patterns of engine operation and duty cycle have resulted in the great many engine operating strategies and component designs that can be seen in the art. For certain engines that are subjected to relatively harsh operating conditions, such as high temperatures and frequent temperature swings, one area of particular research and development interest has included piston geometry and materials. Other research efforts have been directed to preparing pistons that are well-suited to conditions of relatively extreme mechanical duress. Decades of combustion science, materials, and mechanical engineering research have generally revealed that factors such as emissions and efficiency can be affected significantly and often unpredictably by seemingly minor changes in piston shape and features. Commonly owned U.S. Pat. No. 8,978,621 to Easley et al. ("Easley") is directed to a piston having a combustion bowl shaped to balance combustion efficiency and emissions properties. The Easley disclosure proposes a piston having a compound combustion bowl and a compound rim, with an abrupt transition between the compound combustion bowl and the compound rim, with the features together desirably affecting emissions such as particulate matter and NOx, without unduly sacrificing fuel efficiency.

SUMMARY OF THE INVENTION

In one aspect, a method of operating an internal combustion engine includes moving a piston in a cylinder in the internal combustion engine toward a top dead center position such that a pressure in the cylinder is increased up to or above an autoignition pressure, and directly injecting a fuel into the cylinder. The method further includes autoigniting a mixture of the fuel and air when the pressure in the cylinder is at or above the autoignition pressure, and heating material forming an end face of the piston by way of combustion of the autoignited mixture. The end face forms a combustion bowl, an annular piston rim extending circumferentially around a longitudinal piston axis and having a curved profile sloping toward the combustion bowl, and a heat-dissipating chamfer extending axially and radially between the combustion bowl and the annular piston rim. The method still further includes dissipating heat of the material forming the end face to oil conveyed through an oil gallery within the piston.

In another aspect, a piston for an internal combustion engine includes a piston body structured for reciprocation within a cylinder in the internal combustion engine to increase a pressure in the cylinder to an autoignition pressure for autoigniting a mixture of fuel and air. The piston body defines a longitudinal axis extending between a first axial piston body end including a piston end face having a combustion bowl formed therein and an annular piston rim extending circumferentially around the combustion bowl, and a second axial piston body end including a piston skirt and a wrist pin bore formed in the piston skirt. The combustion bowl includes a convex center section transitioning radially outward and axially downward to a combustion bowl floor, and a concave outer section transitioning radially outward and axially upward from the combustion bowl floor to an outer combustion bowl edge. The annular piston rim includes a curved profile and slopes radially inward and axially downward toward the combustion bowl. The piston body further has an oil gallery formed therein, and a chamfer extending circumferentially around the longitudinal axis and axially and radially between the outer combustion bowl edge and the annular piston rim. At least one of a size of the chamfer, an orientation of the chamfer, or a thickness of material of the piston body between the chamfer and the oil gallery is structured to balance heat dissipation to oil in the oil gallery with combustion properties of the piston.

In still another aspect, a piston crown includes a piston body crown piece structured for coupling with a piston body skirt piece to form a one-piece piston body having an oil gallery therein and being reciprocable within a cylinder in an internal combustion engine to increase a pressure in the cylinder to an autoignition pressure for autoigniting a mixture of fuel and air. The piston body crown piece defines a longitudinal axis and includes a piston end face having a combustion bowl formed therein and an annular piston rim extending circumferentially around the combustion bowl. The combustion bowl includes a convex center section transitioning radially outward and axially downward to a combustion bowl floor, and a concave outer section transitioning radially outward and axially upward from the combustion bowl floor to an outer combustion bowl edge. The annular piston rim includes a curved profile and slopes radially inward and axially downward toward the combustion bowl. The piston body crown piece further includes a chamfer extending circumferentially around the longitudinal axis and axially and radially between the outer combustion bowl edge and the annular piston rim. At least one of a size of the chamfer, an orientation of the chamfer, or a thickness of material of the piston body crown piece forming the chamfer is structured to balance heat dissipation to oil in the oil gallery with combustion properties of the piston.

DETAILED DESCRIPTION

Figure 1:
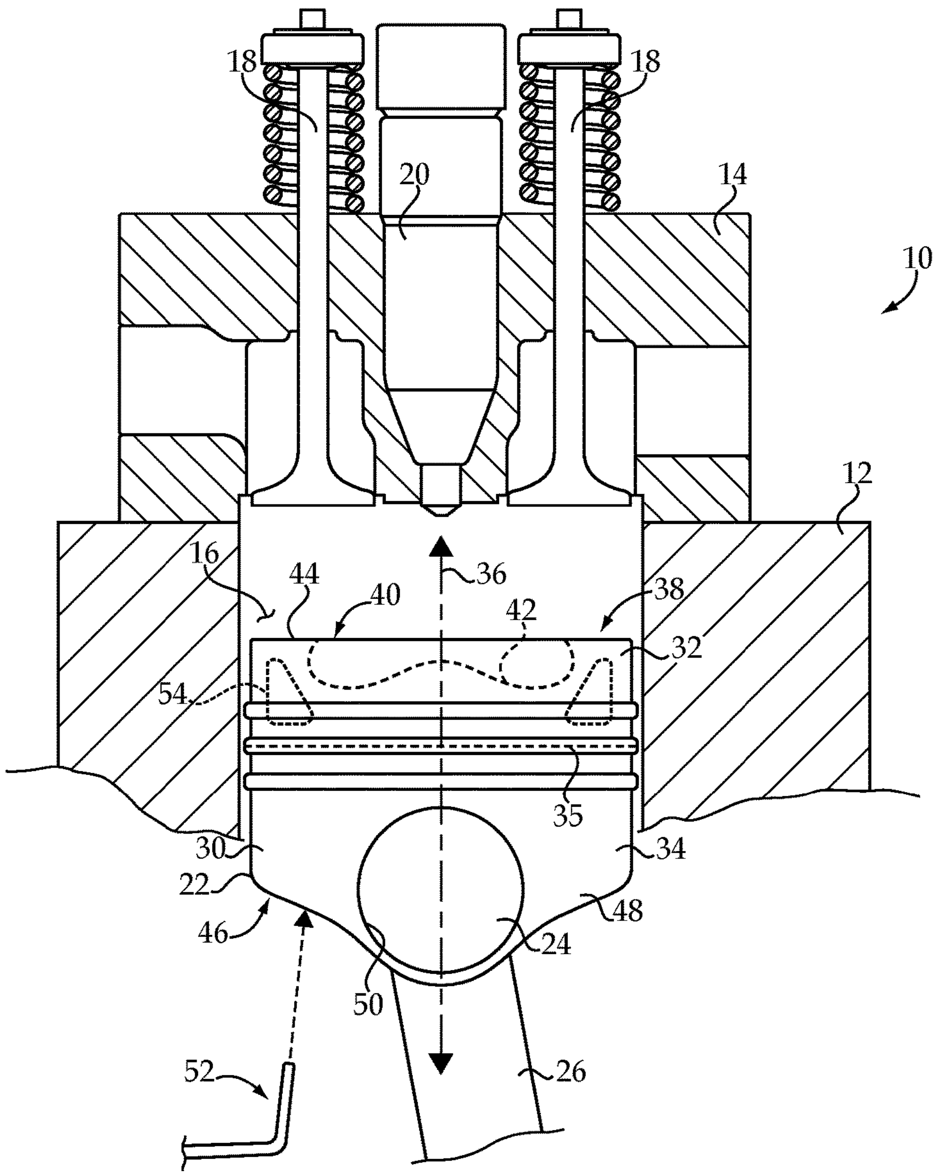
FIG. 1 is a sectioned side diagrammatic view of an internal combustion engine, according to one embodiment.

Referring to FIG. 1, there is shown an internal combustion engine 10 according to one embodiment. Internal combustion engine 10 (hereinafter "engine 10") may be a compression ignition diesel engine, including an engine housing 12 and an engine head 14 coupled to engine housing 12. A plurality of gas exchange valves 18 may be positioned at least partially within engine head 14, and movable in a conventional manner to admit air into a cylinder 16 formed in engine housing 12, and permit exhaust to be expelled from cylinder 16, according to a conventional four-stroke engine cycle. According to the FIG. 1 illustration either one of gas exchange valves 18 could be understood as an intake valve or an exhaust valve. Engine 10 may further be direct injected, and to this end includes a fuel injector 20 positioned within engine head 14 and extending into cylinder 16 for direct injection of a fuel therein. Engine 10 will typically be a multi-cylinder engine, having 4, 6, 8, 10, 12 or more engine cylinders, although only one cylinder 16 is depicted in FIG. 1. Each of a plurality of cylinders formed in engine housing 12 may be associated with at least one intake valve and at least one exhaust valve, and a fuel injector. In other embodiments, a port injected design or some other fuel injection or fuel delivery strategy might be used. A piston 22 is movable within cylinder 16, analogously to any of the other pistons and cylinders that might be part of engine 10, between a bottom dead center position and a top dead center position in a generally conventional manner.

Piston 22 may be coupled with a wrist pin 24, positioned within a wrist pin bore 50, that is in turn coupled with a connecting rod 26 coupled with a crankshaft (not shown). Piston rings 38 are shown positioned upon piston 22. Although no cylinder liner is shown in FIG. 1, those skilled in the art will appreciate that a cylinder liner would typically be used such that piston 22 actually reciprocates within a cylinder liner positioned within engine housing 12. Engine 10 also includes an oil sprayer 52 that is positioned and oriented to spray oil for cooling and lubrication purposes toward an underside of piston 22 in a known manner. Piston 22 may further include a compound piston body 30 defining a longitudinal axis 36, and including a piston body crown piece 32, a piston body skirt piece 34, and a weld 35 attaching piston body crown piece 32 to piston body skirt piece 34.

Engine 10 may experience a range of operating conditions during service, including compression ratios that can be more than 15:1 and in-cylinder pressures during combustion that are still higher, as well as temperatures within an engine cylinder that can regularly exceed 500° C. Although engine 10 and the components used therein are not limited to any particular operating strategy or set of operating conditions, the teachings of the present disclosure may find particular application in engines experiencing relatively high temperatures, typically above 450 degrees C., and in many instances above 500 degrees C. It is contemplated that material of which piston body 30 is formed can be heated to temperatures from about 515 degrees C. to about 535 degrees C., or potentially higher still. As will be further apparent from the following description, piston 22 may be uniquely configured to tolerate harsh operating conditions, especially with respect to the above-mentioned temperature extremes and thermal cycling. Engine 10 may be a relatively large bore diesel engine, having an engine cylinder diameter of about 100 mm to about 200 mm, although the present disclosure is not limited in this regard.

Figure 2:
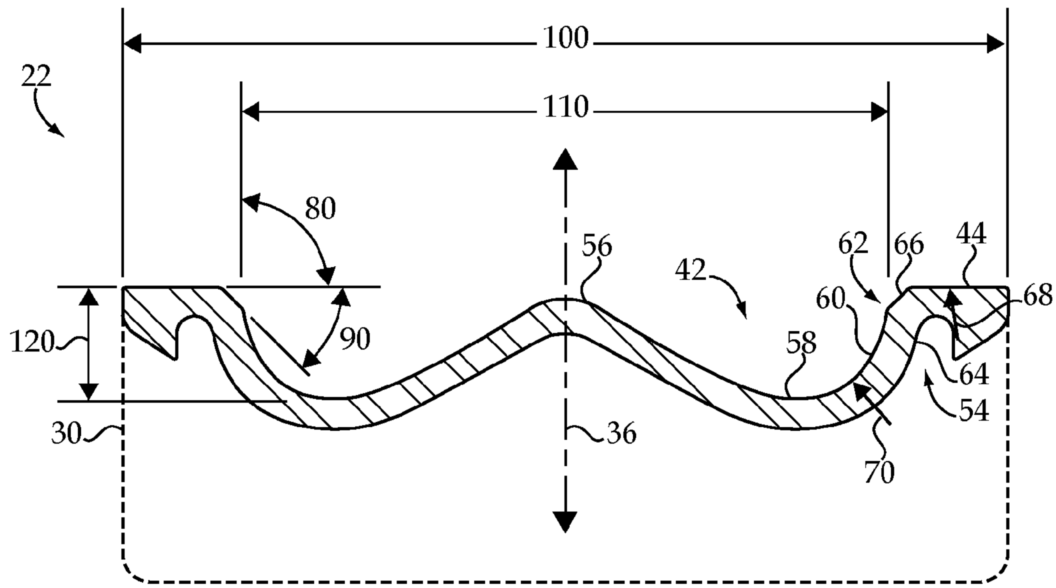
FIG. 2 is a sectioned side diagrammatic view of a piston, according to one embodiment.

Referring also now to FIG. 2, there is shown piston 22 illustrating additional features thereof. It will be appreciated that piston body 30 is structured for reciprocation within cylinder 16, to increase a pressure in cylinder 16 to an autoignition pressure for autoigniting a mixture of fuel and air, such as directly injected diesel distillate fuel. Piston body 30 defines longitudinal axis 36, which extends between a first axial piston body end 38 and a second axial piston body end 46. First axial piston body end 38 includes a piston end face 40 having combustion bowl 42 formed therein, and an annular piston rim 44 extending circumferentially around combustion bowl 42. Second axial piston body end 46 includes piston skirt 48, and wrist pin bore 50 formed in piston skirt 48. Combustion bowl 42 includes a convex center section 56 transitioning radially outward and axially downward to a combustion bowl floor 58, and a concave outer section 60 transitioning radially outward and axially upward from combustion bowl floor 58 to an outer combustion bowl edge 62. Annular piston rim 44 includes a curved profile and slopes radially inward and axially downward toward combustion bowl 42. An outermost part of annular rim 44 might have a flat profile. Piston body 30 further has an oil gallery 54 formed therein, defined in part by a back side cooling surface 64 positioned generally opposite combustion bowl 42. Piston body 30 still further includes a heat-dissipating chamfer 66 extending circumferentially around longitudinal axis 36 and axially and radially between outer combustion bowl edge 62 and annular piston rim 44. At least one of a size of chamfer 66, an orientation of chamfer 66, or a thickness of material of piston body 30 between chamfer 66 and oil gallery 54 is structured to balance heat dissipation to oil in oil gallery 54 with combustion properties of piston 22.

Figure 3:
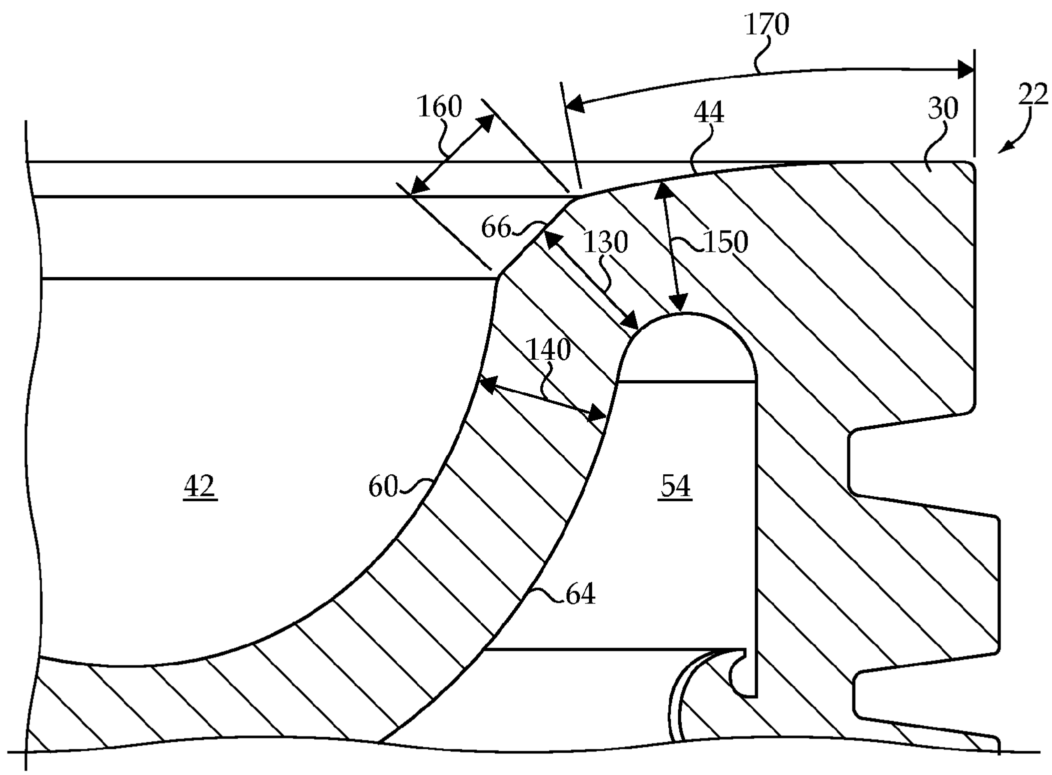
FIG. 3 is a sectioned side diagrammatic view of a portion of the piston of FIG. 2.

Referring now also to FIG. 3, in a practical implementation strategy a running width 160 of chamfer 66 may be greater than 10% of a running width 170 of annular piston rim 44, and may be from about 10% to about 20% of running width 170. In FIG. 3 a first thickness 130 of material is identified which extends between chamfer 66 and oil gallery 54, representing a shortest distance between chamfer 66 and back side cooling surface 64. A second thickness of material 140 extends between combustion bowl 42 and oil gallery 54, representing a shortest distance between combustion bowl 42 and back side cooling surface 64. A third thickness of material 150 extends a shortest distance between annular piston rim 44 and oil gallery 54 and back side cooling surface 64. In a further practical implementation strategy, first thickness 130 may be about 150% or less of second thickness 140 and third thickness 150, and may be from about 100% to about 150% of second thickness 140 and third thickness 150. More particularly, first thickness 130 may be about 110% or less of second thickness 140 and third thickness 150. Running width 160 may be less than first thickness 130 in certain embodiments.

Also depicted in FIG. 2 are certain other dimensional attributes of piston 22, including an outer diameter dimension 100, an angle 90 between chamfer 66 and a horizontal plane oriented normal to longitudinal axis 36, and a radius 68 defined by annular rim 44. Outer diameter dimension 100 may be from about 120 mm to about 160 mm. Angle 90 may be from about 40° to about 50°. Likewise, an angle between chamfer 66 and longitudinal axis 36 will also be understood to be from about 40° to about 50°. Radius 68 may be from about 60 mm to about 80 mm, and may be larger than a second radius 70 that is defined by concave outer section 60 of combustion bowl 42. Also shown in FIG. 2 is a combustion bowl diameter dimension 110, which may be from about 90 mm to about 110 mm, and a bowl depth dimension 120 that may be from about 15 mm to about 25 mm. An angle 80 is also shown between a horizontal plane and a line extending generally vertically upward and approximately tangent to a steepest part of outer section 60 of combustion bowl 42, where outer section 60 meets chamfer 66 at combustion bowl edge 62. Angle 80 may be about 90 degrees or greater such that combustion bowl 42 has a non-reentrant profile. The non-reentrant profile can direct combustion gases outward toward engine housing 12 and/or a cylinder liner, away from engine head 14 and gas exchange valves 18.

As noted above, piston 22 is structured, including by way of chamfer 66, to balance heat dissipation with combustion properties. Those skilled in the art will appreciate that relatively minute changes to piston geometry, and in particular combustion bowl and piston rim geometry, can affect combustion properties such as production of particulate matter, production of oxides of nitrogen or NOx, and fuel efficiency. Those skilled in the art will also be aware that varying certain in-cylinder conditions, including temperature and pressure, can affect, commonly unpredictably, the foregoing and other combustion properties, as well as structural and/or material integrity and thermal fatigue life of a given piston. It will further be understood that much of the energy of combustion is converted into kinetic energy of a piston, however, some of the energy of combustion is transferred to heat energy of material of which the piston and other engine hardware is formed, and ultimately dissipated at least in part to cooling oil.

As described herein, certain optimal or target material thicknesses, ranges and relative proportions among the thicknesses may be employed in constructing piston 22. These material thicknesses can affect the extent to which and the rate at which heat is dissipated to oil conveyed through oil gallery 54. Chamfer 66 may be understood to shorten a distance that at least a part of piston end face 40 is spaced from oil gallery 54. If first thickness 130 were decreased further such as with a larger or deeper chamfer, heat could be dissipated relatively more rapidly to a given volume or flow of oil through oil gallery 54. Dissipating heat from material of which piston body 30 is formed to the oil too rapidly, however, could heat the oil too much, ultimately resulting in coking or other problems. If heat is not dissipated effectively enough, such as where chamfer 66 is not as large or deep, material of which piston body 30 is formed could be heated beyond temperatures for which it is designed, or at the least accelerate thermal fatigue of the material. Optimum material thickness, and variations in thickness across different parts of a piston end face, can also be dictated in part by structural specifications. Variations that are too large, or chamfer angles that are too steep or too shallow, could result in unevenness in heat dissipation, insufficient heat dissipation, increased thermal fatigue sensitivity, or still other problems. In parallel with the heat dissipation capability of chamfer 66 are concerns relating to production of particulate matter, production of NOx, a balance between particulate matter and NOx, and fuel efficiency. As discussed herein, seemingly minor variations to a piston design can have relatively large and often unpredictable effects on such combustion properties.

INDUSTRIAL APPLICABILITY

Referring to the drawings generally, operating internal combustion engine 10 can include moving piston 22, and such other pistons as engine 10 might include, in a corresponding cylinder 16 toward a top dead center position such that a pressure in cylinder 16 is increased up to or above an autoignition pressure. Just prior to or after pressure in cylinder 16 has been increased up to or above the autoignition pressure, fuel injector 20 can be operated to directly inject fuel into cylinder 16. The directly injected fuel in a mixture with air can autoignite within cylinder 16, and in particular within combustion bowl 42. The combustion of the autoignited mixture can heat material forming end face 40 of piston 22, by way of the energy release that results from burning of the injected fuel. The heat of the material forming end face 40, and other parts of piston 22, can be dissipated to oil conveyed through oil gallery 54. In particular, the dissipating of heat can further include dissipating heat of the material forming piston end face 40 to oil in contact with back side cooling surface 64 forming oil gallery 54 within crown 32 and piston 22. Oil sprayer 52 can meanwhile be spraying oil continuously into an inlet (not shown) that leads to oil gallery 54, with the sprayed oil once heated within oil gallery 54 draining through an outlet (not shown) and eventually to an oil sump, typically after passing through an oil to coolant heat exchanger or another suitable oil cooler apparatus.

Due to improved cooling capability, operation of engine 10 and other engines contemplated herein can occur under conditions that enable engine 10 to have a relatively higher power density than certain other known engines. In a practical implementation strategy, heating of the material forming end face 40 can include heating the material to a temperature of about 450 degrees C. or greater, and in some instances heating the material to a temperature from about 515 degrees C. to about 535 degrees C. Operation of engine 10 at such conditions can produce about 130 kilowatts per cylinder or greater power output of engine 10 at a brake mean effective pressure of about 2500 kilo Pascals or greater by way of the combustion of the autoignited mixture of fuel and air. Dissipating heat as described herein can further include transferring about 8% or less of the power output of engine 10 to oil conveyed through oil gallery 54. In one embodiment, the oil may be conveyed through oil gallery 54 at a flow rate of about 5 kilograms or less per kilowatt-hour of operation of internal combustion engine 10.

It should be appreciated that the foregoing description of operation of internal combustion engine 10 is but one example of a relatively high performance application. Piston rim temperatures in such instances might rise as high as 550 degrees C. at least for relatively short periods of time. In other instances, engine 10 could be operated at still higher power outputs, or at lower power outputs for extended periods of time. The present disclosure is contemplated to enable operation of certain engines at a power output of about 75 kilowatts or greater per cylinder at a brake mean effective pressure of about 1900 kilo Pascals, continuously for periods of time of several thousand hours. Such operating parameters could be obtained at a power output transfer to the oil and oil flow rates similar to those discussed above.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of operating an internal combustion engine comprising:

moving a piston in a cylinder of the internal combustion engine toward a top dead center position such that a pressure in the cylinder is increased up to or above an autoignition pressure;

directly injecting a fuel into the cylinder via a fuel injector;

autoigniting a mixture of the fuel and air when the pressure in the cylinder is at or above the autoignition pressure;

heating a material forming an end face of the piston by way of combustion of the autoignited mixture, the end face of the piston being defined by a non-reentrant combustion bowl, an annular piston rim having a curved profile, and a heat-dissipating chamfer, such that the annular piston rim extends circumferentially around a longitudinal piston axis and slopes toward the heat-dissipating chamfer, and wherein the heat-dissipating chamfer extends axially and radially between an outer edge of the combustion bowl and the annular piston rim, said heat-dissipating chamfer being oriented at an angle of approximately 40 to 50 degrees relative to the longitudinal piston axis; and dissipating heat from the material forming the end face of the piston to oil flowing through an oil gallery disposed within the piston, the oil gallery defined by a back side cooling surface of the piston that is positioned opposite to the combustion bowl such that the back side cooling surface extends parallel to in a concave outer section of the combustion bowl.

2. The method of claim 1 wherein the oil gallery is formed within a crown of the piston.

3. The method of claim 2 wherein the dissipating of the heat from the material forming the end face of the piston further includes dissipating the heat through a first thickness of the material between the heat-dissipating chamfer and the back side cooling surface, through a second thickness of the material between the combustion bowl and the back side cooling surface, and through a third thickness of the material between the annular piston rim and the back side cooling surface.

4. The method of claim 3 wherein the first thickness is from about 100% to about 150% of each of the second thickness and the third thickness.

5. The method of claim 4 wherein the first thickness is from about 100% to about 110% of each of the second thickness and the third thickness.

6. The method of claim 2 wherein the heating of the material forming the end face of the piston further includes heating the material to a temperature of about 450 degrees C. or greater.

7. The method of claim 6 wherein the heating of the material forming the end face of the piston further includes heating the material to a temperature from about 515 degrees C. to about 535 degrees C.

8. The method of claim 7 further comprising producing about 130 kilowatts or greater power output from the internal combustion engine at a brake mean effective pressure of about 2500 kilo Pascals or greater by way of the combustion of the autoignited mixture of fuel and air.

9. The method of claim 8 wherein the dissipating of the heat from the material forming the end face of the piston further includes transferring about 8% or less of the power output of the internal combustion engine to the oil.

10. The method of claim 9 further comprising conveying the oil through the oil gallery at a flow rate of about 5 kilograms of oil or less per kilowatt-hour of operation of the internal combustion engine.

11. A piston for an internal combustion engine comprising:

a piston body structured for reciprocation within a cylinder of the internal combustion engine to increase a pressure in the cylinder to an autoignition pressure for autoigniting a mixture of fuel and air, the piston body including a piston end face, the piston end face defined by a non-reentrant combustion bowl, an annular piston rim having a curved profile, and a chamfer, such that the annular piston rim extends circumferentially around a longitudinal piston axis and slopes toward the chamfer, and wherein the chamfer extends axially and radially between an outer edge of the combustion bowl and the annular piston rim, said chamfer being oriented at an angle of approximately 40 to 50 degrees relative to the longitudinal piston axis;

the piston body further defined by an oil gallery formed therein, the oil gallery defined by a back side cooling surface of the piston that is positioned opposite to the combustion bowl such that the back side cooling surface extends parallel to a concave outer section of the combustion bowl, such that at least one of a size of the chamfer, an orientation of the chamfer, or a thickness of a material of the piston body between the chamfer and the oil gallery is structured to balance heat dissipation to oil flowing through the oil gallery with combustion properties of the piston.

12. The piston of claim 11, wherein a running width of the chamfer is from about 10% to about 20% of a running width of the annular piston rim and about 50% of the thickness of the material between the chamfer and the oil gallery.

13. The piston of claim 11 wherein a running width of the chamfer is less than the thickness of the material between the chamfer and the oil gallery.

14. The piston of claim 13 wherein the thickness of the material includes a first thickness of the material between the chamfer and the back side cooling surface, a second thickness of the material between the combustion bowl and the back side cooling surface, and a third thickness of the material between the annular piston rim and the back side cooling surface.

15. The piston of claim 14 wherein the first thickness is from about 100% to about 150% of each of the second thickness and the third thickness.

16. The piston of claim 15 wherein the first thickness is about 100% to about 110% of each of the second thickness and the third thickness.

17. The piston of claim 12 wherein an outer diameter dimension of the piston body is from about 120 millimeters to about 160 millimeters, and a radius defined by the annular piston rim is from about 60 millimeters to about 80 millimeters.

18. The piston of claim 17 wherein a bowl diameter dimension of the combustion bowl is from about 90 millimeters to about 110 millimeters.

19. A piston crown comprising:

a piston body crown piece structured for coupling with a piston body skirt piece to form a one-piece piston body having an oil gallery formed therein and being reciprocal within a cylinder of an internal combustion engine to increase a pressure in the cylinder to an autoignition pressure for autoigniting a mixture of fuel and air, the piston body crown piece including a piston end face, the piston end face defined by a non-reentrant combustion bowl, an annular piston rim having a curved profile, and a chamfer, such that the annular piston rim extends circumferentially around a longitudinal piston axis and slopes toward the chamfer, and wherein the chamfer extends axially and radially between an outer edge of the combustion bowl and the annular piston rim, said chamfer being oriented at an angle of approximately 40 to 50 degrees relative to the longitudinal piston axis;

the oil gallery defined by a back side cooling surface of the piston body that is positioned opposite to the combustion bowl such that the back side cooling surface extends parallel to a concave outer section of the combustion bowl, such that at least one of a size of the chamfer, an orientation of the chamfer, or a thickness of a material of the piston body between the chamfer and the oil gallery is structured to balance heat dissipation to oil flowing through the oil gallery with combustion properties of the piston.

20. The piston crown of claim 19 wherein:

the thickness of the material includes a first thickness of the material between the chamfer and the back side cooling surface, a second thickness of the material between the combustion bowl and the back side cooling surface, and a third thickness of the material between the annular piston rim and the back side cooling surface;

the first thickness is from about 100% to about 150% of each of the second thickness and the third thickness; and a running width of the chamfer is from about 10% to about 20% of a running width of the annular piston rim and about 50% of the first thickness.

* * * * *